US008948108B2

United States Patent
Stenfelt et al.

(12) United States Patent
(10) Patent No.: US 8,948,108 B2
(45) Date of Patent: Feb. 3, 2015

(54) RESOURCE RESERVATION IN MULTIPLE ACCESSES

(75) Inventors: John Stenfelt, Gothenburg (SE); Dirk Kopplin, Ytterby (SE); Stefan Rommer, Vastra Frolunda (SE); Hans Ronneke, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 47 days.

(21) Appl. No.: 13/503,071

(22) PCT Filed: Oct. 21, 2009

(86) PCT No.: PCT/EP2009/063814
§ 371 (c)(1),
(2), (4) Date: Apr. 20, 2012

(87) PCT Pub. No.: WO2011/047719
PCT Pub. Date: Apr. 28, 2011

(65) Prior Publication Data
US 2012/0230287 A1    Sep. 13, 2012

(51) Int. Cl.
*H04W 72/04* (2009.01)
*H04L 12/54* (2013.01)
*H04L 12/911* (2013.01)
*H04L 12/913* (2013.01)
*H04L 12/927* (2013.01)

(52) U.S. Cl.
CPC ............ *H04L 12/5695* (2013.01); *H04L 47/72* (2013.01); *H04L 47/724* (2013.01); *H04L 47/805* (2013.01); *H04L 47/824* (2013.01)
USPC .......................................................... 370/329

(58) Field of Classification Search
CPC ... H04W 28/04; H04W 72/04; H04W 72/042; H04W 88/08; H04L 5/0007
USPC .................................................. 370/329, 388
See application file for complete search history.

(56) References Cited

U.S. PATENT DOCUMENTS 7,394,800 B2 *   7/2008   Sood et al. ..................... 370/348
7,836,189 B2 *  11/2010   Sun et al. ....................... 709/227

(Continued)

OTHER PUBLICATIONS

ETSI TS 29.212 Ver 8.0.0 (Oct. 2008).*

(Continued)

*Primary Examiner* — Melvin Marcelo
*Assistant Examiner* — Peter Solinsky
(74) *Attorney, Agent, or Firm* — Rothwell, Figg, Ernst & Manbeck P.C.

(57) ABSTRACT

The present invention relates to a method for enabling resource allocation for a service data flow between a user equipment (14) and a gateway in a multiple access environment. The method comprises the steps of:—A resource reservation device (10,19) receives reservation instructions from a policy control node (13). The reservation instructions require dedicated access resources to be reserved for the service data flow.—The resource reservation device (10,19) reports the result of the resource reservation required by the reservation instructions to the policy control node (13). What particularly characterize the method are the steps of:—The resource reservation device (10,19) requests reservation of the resources required by the reservation instructions in a plurality of accesses (11,12).—The resource reservation device (10,19) reports the selected single access (11,12) that enables the requested resources to the policy control node (13). This is reported when the access (11,12) is selected.

25 Claims, 9 Drawing Sheets

(56) References Cited

U.S. PATENT DOCUMENTS

| | | | |
|---|---|---|---|
| RE42,204 E * | 3/2011 | Utsumi et al. | 370/352 |
| 7,924,786 B2 * | 4/2011 | Oh et al. | 370/331 |
| 7,958,245 B2 * | 6/2011 | Thomas et al. | 709/227 |
| 8,089,944 B2 * | 1/2012 | Beser | 370/341 |
| 8,122,136 B2 * | 2/2012 | Bernier et al. | 709/229 |
| 8,141,143 B2 * | 3/2012 | Lee | 726/12 |
| 8,179,903 B2 * | 5/2012 | Gupta et al. | 370/400 |
| 8,331,935 B2 * | 12/2012 | Tamura et al. | 455/436 |
| 8,462,735 B2 * | 6/2013 | Sun et al. | 370/331 |
| 2004/0252674 A1 * | 12/2004 | Soininen et al. | 370/352 |
| 2006/0274730 A1 * | 12/2006 | Medlock et al. | 370/352 |
| 2007/0064948 A1 * | 3/2007 | Tsirtsis et al. | 380/270 |
| 2008/0130656 A1 * | 6/2008 | Kim et al. | 370/395.21 |
| 2008/0144579 A1 * | 6/2008 | Sood | 370/332 |
| 2009/0154702 A1 * | 6/2009 | Tamura et al. | 380/270 |
| 2009/0252136 A1 * | 10/2009 | Mahany et al. | 370/338 |
| 2009/0268746 A1 * | 10/2009 | Ogasahara et al. | 370/406 |
| 2010/0118200 A1 * | 5/2010 | Gelman et al. | 348/578 |
| 2010/0124198 A1 * | 5/2010 | Wong | 370/329 |
| 2011/0075675 A1 * | 3/2011 | Koodli et al. | 370/401 |
| 2011/0208838 A1 * | 8/2011 | Thomas et al. | 709/219 |
| 2011/0292914 A1 * | 12/2011 | Sachs et al. | 370/332 |
| 2012/0057511 A1 * | 3/2012 | Sivakumar et al. | 370/310 |
| 2012/0087362 A1 * | 4/2012 | Islam et al. | 370/338 |
| 2012/0099447 A1 * | 4/2012 | Bhaskaran et al. | 370/252 |
| 2012/0127943 A1 * | 5/2012 | Chen et al. | 370/329 |
| 2012/0147776 A1 * | 6/2012 | McNair et al. | 370/252 |
| 2013/0107702 A1 * | 5/2013 | Gupta et al. | 370/230 |
| 2013/0294243 A1 * | 11/2013 | Wiley et al. | 370/235 |

OTHER PUBLICATIONS

J.J. Balbas et al., Policy and Charging Control in the Evolved Packet System, IEEE Communications Magazine, IEEE Service Center, Piscataway, US, vol. 44, No. 2, Feb. 1, 2009, pp. 68-74, XP011251778.

M.I. Corici et al., "A Network Controlled QoS Model over the 3GPP System Architecture Evolution", Wireless Broadband and Ultra Wideband Communications, 2007, AusWireless 2007, The 2nd International Conference on, IEEE, PI, Aug. 1, 2007, 6 pages, XP031132781.

"3rd Generation Partnership Project; Technical Specification Group Services and System Aspects; Policy and Charging Control Architecture; (Release 7); 3GPP TS 23.203"ETSI Standards, Lis Sophia Antipolis Cedex, France, vol. 3-SA2, No. VO 4.0, Feb. 1, 2006, XP014033549.

\* cited by examiner

RESOURCE RESERVATION IN MULTIPLE ACCESSES

CROSS-REFERENCE TO RELATED APPLICATION

This application is a 35 U.S.C. §371 National Phase Entry Application from PCT/EP2009/063814, filed Oct. 21, 2009, and designating the United States.

TECHNICAL FIELD

The present invention relates to a method for enabling resource allocation for a service data flow between a User Equipment and a Gateway in a multiple access environment. It also relates to a resource reservation device, a policy control node and a system adapted for the same purpose.

BACKGROUND

It has become more and more common that a terminal (UE/MS) can get access via a number of different access technologies. For example, mobile phones often come equipped with both cellular and WLAN (Wireless LAN) access capabilities. Laptops often have Ethernet, WLAN and sometimes also cellular access capabilities. Typically these different interfaces are used one at a time. And more importantly, a given service or a given IP session is only using one access at a time.

Currently, 3GPP EPS—Evolved Packet System (also known as 3GPP SAE—System Architecture Evolution) defines solutions for how session continuity can be achieved when a UE moves between different accesses. This can e.g. mean that a service that is running over a cellular access is moved to run over a WLAN access instead. But also with this solution, the UE is only using one access at a time and during an access change, the whole IP session and all running services within that IP session is moved from source access to target access. Simultaneous use of multiple accesses (a.k.a. multihoming) is not supported, except for very short times during a handover between two accesses.

There is work ongoing in IETF (Internet Engineering Task Force), and related work is started up in 3GPP, for defining mobility solutions in multihoming scenarios. As part of this work the concept of "flow mobility" is investigated, i.e. only a subset of the IP flows for a given IP session is moved from one access to another. For example, it could be that only the video component of a multimedia call is moved from a cellular access to WLAN, while the IP flows related to the voice component of the same call stays in the cellular access.

Figure 1:
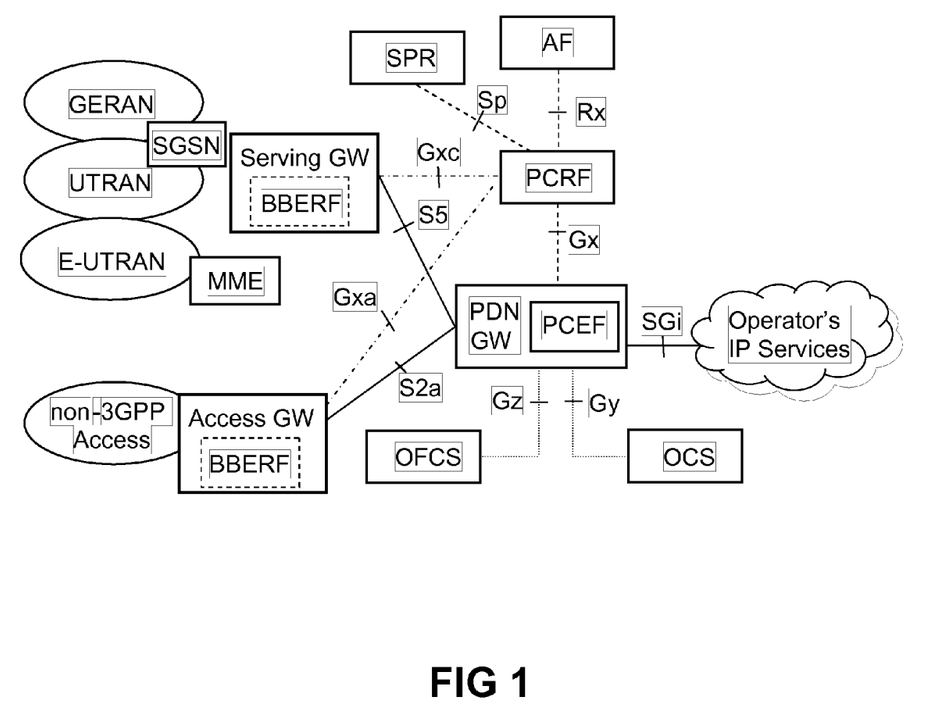
FIG. 1 illustrates 3GPP Release 8 PCC non-roaming architecture for EPS.

Policy and Charging Control (PCC) architecture was introduced in 3GPP Rel-7 and has been further evolved in 3GPP Rel-8, see FIG. 1. It provides operators with advanced tools for service-aware QoS (Quality of Service) and charging control. A PCEF (Policy and Charging Enforcement Function) is encompassed in a GW (Gateway), i.e. GGSN (Gateway GPRS Support Node) for GPRS (General Packet Radio Service) based core network and a PDN-GW (Packet Data Network Gateway) for EPC (Evolved Packet Core) based core network. When GTP (GPRS Transfer Protocol) is used to connect to the PCEF, the PCEF has bearer binding and QoS reservation capabilities. This architecture variant is referred to as on-path PCC.

The amendments in Rel-8 include support for Mobile IP based protocols in the EPC. When mobile IP is used between the GW and the Serving GW (for 3GPP based access) or in the Access GW (for non-3GPP based access), the PCC architecture must also rely on a BBERF (Bearer Binding and Event Reporting Function) for bearer binding and event reporting. The BBERF is encompassed in the Serving GW for 3GPP based access and in the Access GW for non-3GPP based access. This architecture variant is referred to as off-path PCC. In the off-path architecture the PCEF do not have the capabilities to reserve resources or to do bearer binding. A PCRF (Policy and Charging Rules Function) authorize the use of a service by installing and removing PCC rules into the PCEF and QoS rules into the BBERF (if applicable).

FIG. 1 also shows a SGSN (Serving GPRS Support Node and an MME (Mobility Management Entity). It also shows a number of reference points (Sp, Rx, Gxc, S5, Gxa, S2a, Gz, Gy, Gx, SGi) for the communication between the nodes. These nodes and reference points and part of 3GPP or non-3GPP and will not be described more in detail in this patent application.

A PCC or QoS rule defines a set of filters used to classify packets to a service data flow and an associated resource, i.e. a QoS class and a bitrate. For on-path PCC, the installation or removal of a PCC rule in the PCEF may trigger a resource request in the applicable access. For off-path PCC, the installation or removal of a QoS rule in the BBERF may trigger a resource request in the applicable access. PCC rules are installed and removed in the PCEF also in the case of off-path PCC however for this case they can not trigger a resource request in the access but they are only used for access control and charging.

Some services e.g. telephony or audio/video streaming require resources to be reserved in the target access in order to be able to provide a good enough quality of service level to the end user(s). The functionality to admit or deny the addition of any such service in the network is based on current network load. Admission control takes place at various points in the network at session setup and during handovers. For the case when dynamic PCC is deployed it is the installation of PCC or QoS rules (if applicable) with a GBR-component in the PCEF or BBERF (if applicable) that triggers this reservation of resources in the network. If the reservation of resources fails (not enough capacity in the system at some level) then the PCEF or BBERF will report this back to the PCRF and the associated service will not be admitted (for new service requests) or discontinued (handover).

Many operators today already have parallel cellular access technologies deployed such as GSM and UMTS. One lesson learned from the 1G to 2G and 2G to 3G migration is that customers are often reluctant to using the new access since coverage and capacity is not good enough in the new networks. As a consequence operators are forced to rollout their networks in a very aggressively pace in order to prevent an unacceptable call blocking rate in the new access. This is of course very expensive to the operators and even worse it creates a threshold for when a new access network may be commercially launched. A serious consequence of this is that it delays the time before the network will start to generate revenue for the operator.

SUMMARY

The object of the present invention is therefore to reduce the call blocking rate in new networks rolled out.

The object of the present invention is solved by means of a method for enabling resource allocation for a service data flow between a User Equipment and a Gateway in a multiple access environment. The method comprises the steps of:

A resource reservation device receives reservation instructions from a policy control node. The reservation instructions require dedicated access resources to be reserved for the service data flow.

The resource reservation device reports the result of the resource reservation required by the reservation instructions to the policy control node.

What particularly characterize the method are the steps of:

The resource reservation device requests reservation of the resources required by the reservation instructions in a plurality of accesses.

The resource reservation device reports the selected single access that enables the requested resources to the policy control node. This is reported when the access is selected.

The object of the present invention is also solved by means of a resource reservation device. The resource reservation device is adapted to enable resource allocation for a service data flow between a User Equipment and a Gateway in a multiple access environment. The resource reservation device is further adapted to receive reservation instructions from a policy control node (see below). The reservation instructions require dedicated access resources to be reserved for the service data flow. The resource reservation device is moreover adapted to report the result of the resource reservation required by the reservation instructions to the policy control node.

What particularly characterize the resource reservation device is that it is further adapted to request reservation of the resources required by the reservation instructions in a plurality of accesses. It is also adapted to report the selected single access that enables the requested resources to the policy control node. This is reported when the access is selected.

The object of the present invention is also solved by means of a policy control node. The policy control node is adapted to enable resource allocation for a service data flow between a User Equipment and a Gateway in a multiple access environment. The policy control node is further adapted to send reservation instructions to a resource reservation device (see above). The reservation instructions require dedicated access resources to be reserved for the service data flow. The policy control node is moreover adapted to receive a report from the resource reservation device regarding the result of the resource reservation required by the reservation instructions.

What particularly characterize the policy control node is that it is further adapted to receive a report from the resource reservation device. The report is received when the access is selected and regards the selected single access that enables the requested resources.

The object of the present invention is finally solved by means of a system. The system is adapted to enable resource allocation for a service data flow between a User Equipment and a Gateway in a multiple access environment. A resource reservation device in the system is adapted to being adapted to receive reservation instructions from a policy control node in the system. The reservation instructions require dedicated access resources to be reserved for the service data flow. The resource reservation device is moreover adapted to report the result of the resource reservation required by the reservation instructions to the policy control node.

What particularly characterize the system is that the resource reservation device is further adapted to request reservation of the resources required by the reservation instructions in a plurality of accesses. The resource reservation device is also adapted to report the selected single access that enables the requested resources to the policy control node. This is reported when the access is selected.

The main advantage with the present invention is that, since resource reservation is attempted in multiple accesses before a failure is reported back to the PCRF, no calls will be lost during high load situations unless all available accesses are congested. As a result call blocking probability will decrease and the aggregated utilization of all access types of an operator will increase.

New networks with less capacity initially can be implemented without the risk of users being blocked due to the initial limited capacity of the new access. If a call is not admitted in the new access, then legacy access types will be used for the call. The requirement is however that a more mature legacy networks exist in parallel that are able to handle the excess voice and video traffic.

Additional advantages are achieved by implementing one or several of the features of the dependent claims not mentioned above. This will be further explained below.

BRIEF DESCRIPTION OF THE DRAWINGS

The invention will be described in greater detail in the following, with reference to the embodiments that are shown in the attached drawings, in which.

DETAILED DESCRIPTION

The present invention relates to a method for enabling resource allocation for a service data flow between a User Equipment and a Gateway in a multiple access environment. It also relates to a resource reservation device, a policy control node and a system adapted for the same purpose. A person skilled in the art would realize that a resource reservation device, a policy control node and a system adapted to perform said method described below are also disclosed in the following. The service data flow relates to data traffic for a particular service in the User Equipment.

Figure 2:
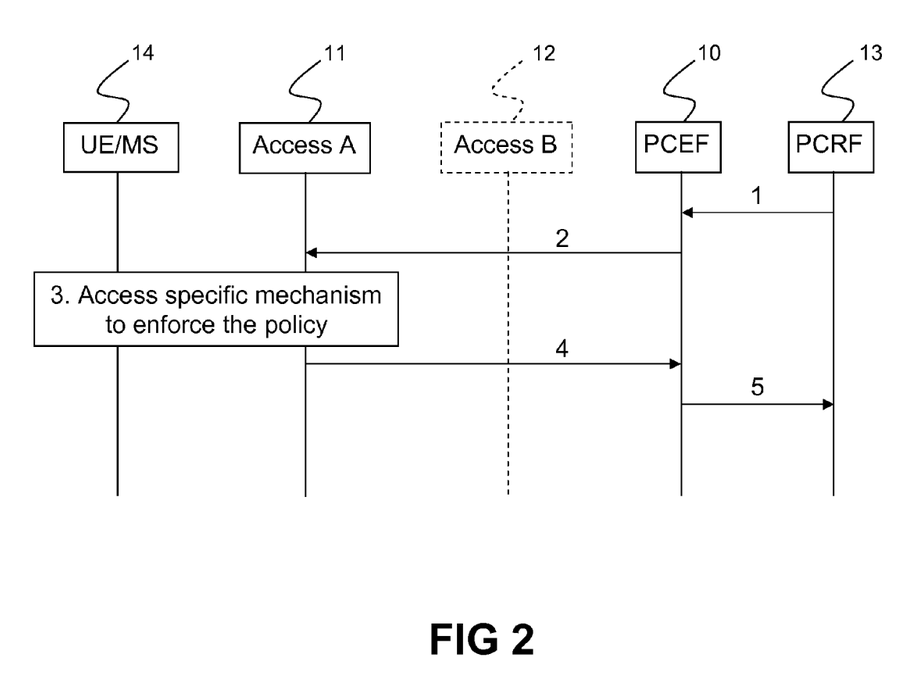
FIG. 2 illustrates the known solution for resource allocation.

FIG. 2 illustrates an existing procedure for allocation of resources when only a single access network at a time is considered. The resources are allocated in a scenario when on-path PCC is used:

1. A policy control node provides new or updated reservation instructions to the resource reservation device for a certain Service Data Flow. The reservation instructions require dedicated resources to be reserved in the access network 11 (Access A). Although multiple allowed accesses 11,12 may exist in parallel (illustrated by Access B in the figure) the UE/MS can only be active in one single access system at a time.

2. The resource reservation device requests reservation of the required resources in the access 11 where the UE/MS is currently active (access A).

3. In case resources are available then they are reserved in the access 11 (Access A). A User Equipment 14 (UE/MS) is a part in the reservation.

4. The result of the reservation request is communicated back to the resource reservation device 10.

5. The result of the resource reservation is reported back to the policy control node 13. In case the required resources could not be reserved then the associated service may not be admitted.

In the following, the inventive method enabling resource allocation for a service data flow between a User Equipment and a Gateway in a multiple access environment will be described. The method is intended to solve the problem that calls are lost during busy hour in a new network of low capacity since only a single access network is used for resource allocation. This is for instance a problem in the example shown in FIG. 2.

The accesses are in the following for instance (see FIG. 1) GERAN (GSM Radio Access Network), UTRAN (UMTS Terrestial Radio Access Network), E-UTRAN (Evolved UTRAN) or non-3GPP accesses, see FIG. 1. A person skilled in the art would realize that other types of accesses are also embraced within the term "access".

Figure 3:
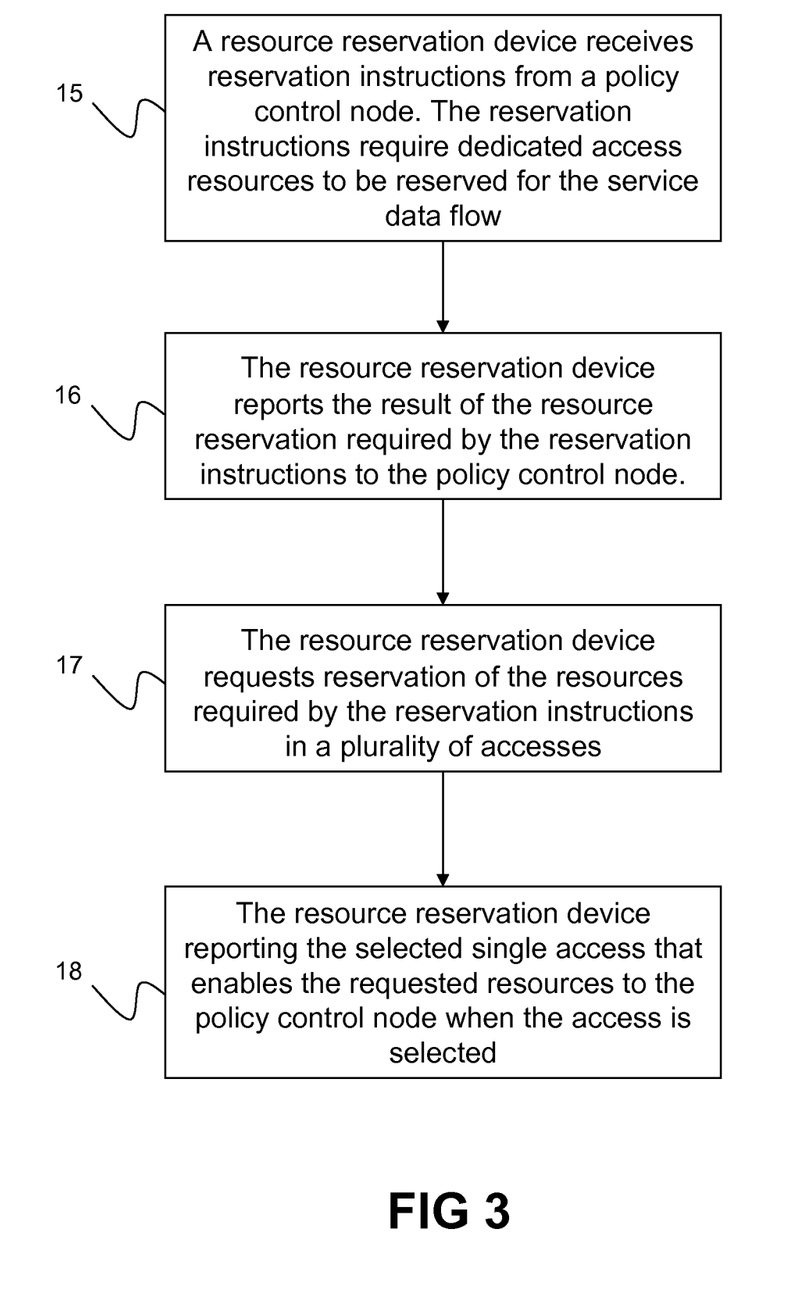
FIG. 3 illustrates the method according to the present invention.

In the present invention the following method steps are performed, see FIG. 3:

1. A resource reservation device 10 receives 15 reservation instructions from a policy control node 13. The reservation instructions require dedicated access resources to be reserved for the service data flow.

2. The resource reservation device 10 reports 16 the result of the resource reservation required by the reservation instructions to the policy control node 13.

3. The resource reservation device requests 17 reservation of the resources required by the reservation instructions in a plurality of accesses.

4. The resource reservation device 10 reports 18 the selected single access that enables the requested resources to the policy control node 13 when the access is selected.

The present invention does not require that the steps 1-4 are performed in consecutive order. Steps 1 and 2 are part of commonly known and used procedures (see FIG. 2) while steps 3 and 4 are further steps performed by the resource reservation device 10 to reserve resources. These are performed when it has received the reservation instructions.

The resource reservation device is in the following exemplified by a PCEF 10 or a BBERF 19 (Bearer Binding and Event Reporting Function). The policy control node is in the following exemplified by a PCRF 13 (Policy and Charging Rules Function). The reservation instructions are in the following exemplified by PCC (Policy and Charging Control) rules or QoS (Quality of Service) rules. The rules comprise a set of information enabling the detection of a service data flow and providing parameters for policy control and/or charging control. Further definition of PCC rules and QoS rules can be found in 3GPP.

The PCEF (Policy and Charging Enforcement Function) is encompassed in a GW (Gateway). For instance a GGSN (Gateway GPRS Support Node) for GPRS (General Packet Radio Service) based core network or a PDN-GW (Packet Data Network Gateway) for EPC (Evolved Packet Core) based core network. This architecture variant is referred to as on-path PCC. The BBERF is encompassed in a Serving GW for 3GPP based access and in an Access GW for non-3GPP based access. This architecture variant is referred to as off-path PCC. See FIG. 1.

The PCC or QoS rule received in the present invention comprises information from which access or accesses the PCEF or BBERF should request reservation of resources. With MAPIM (Multi Access PDN connectivity and IP flow Mobility) multiple access types may be available that could potentially be used to carry services that requires dedicated resources. If a certain service is allowed to be provided over multiple access types, then the PCRF could e.g. indicate this in the rules as a list of allowed access types.

Figure 4:
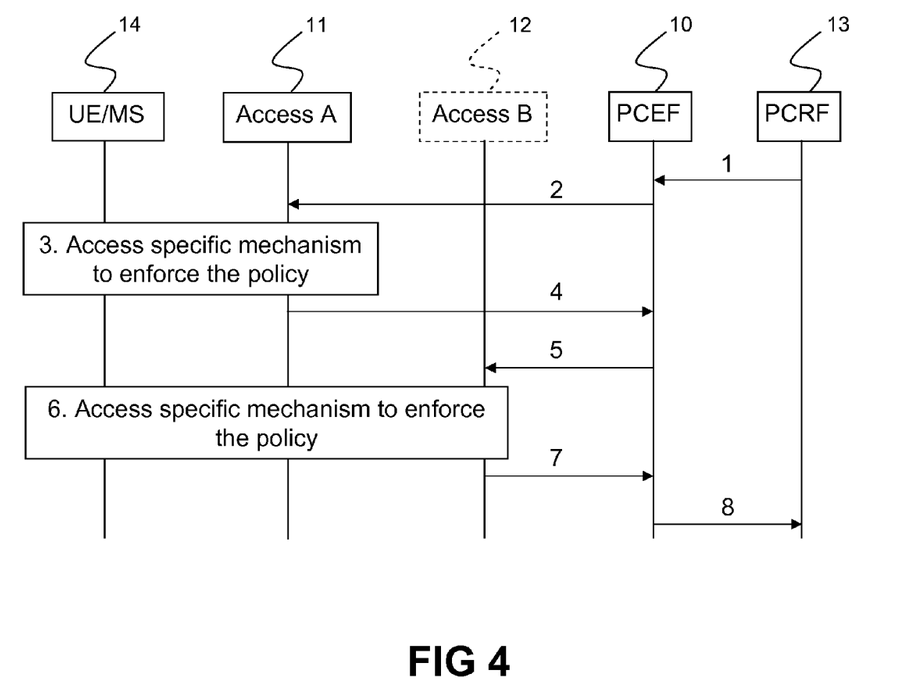
FIG. 4 illustrates a first alternative of sequential reservation of resources according to the present invention.
Figure 5:
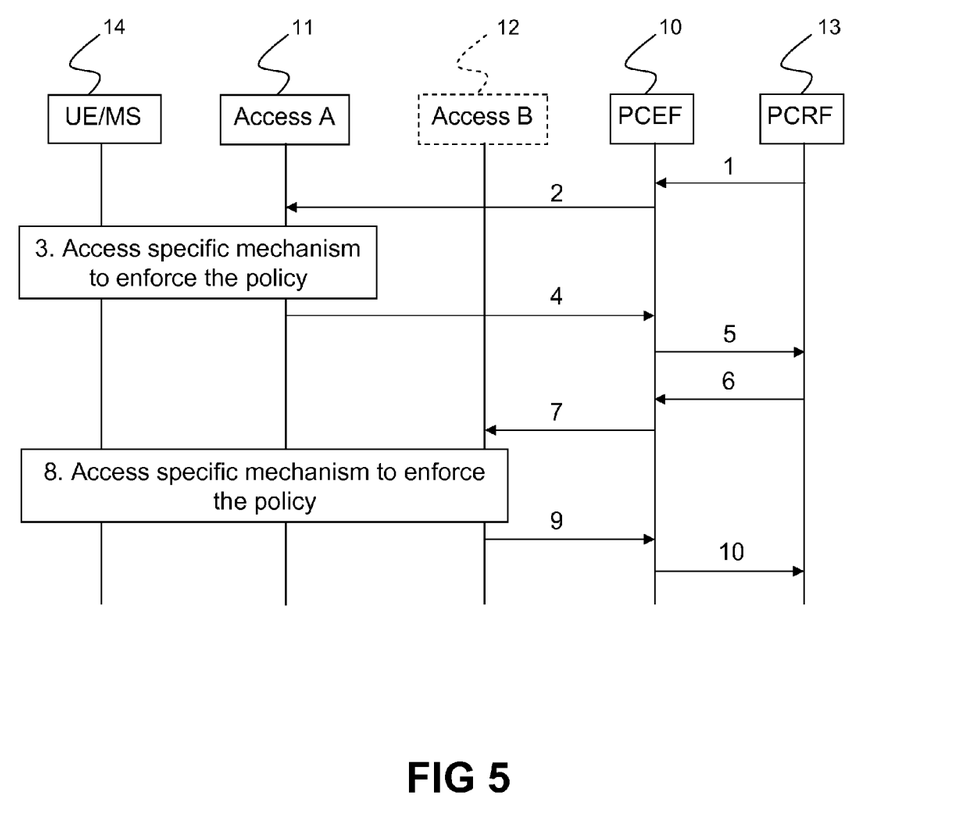
FIG. 5 illustrates a second alternative of sequential reservation of resources according to the present invention.
Figure 6:
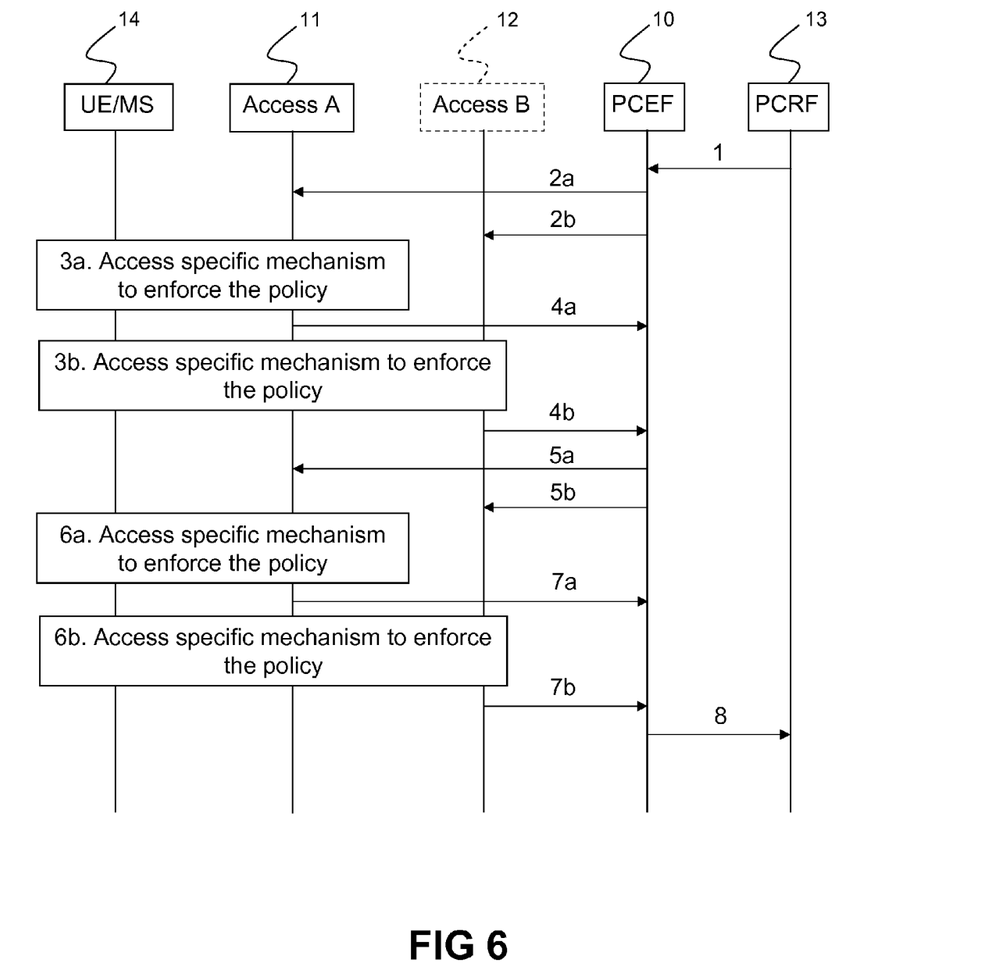
FIG. 6 illustrates a first alternative of parallel reservation of resources according to the present invention.

Firstly, with reference to FIGS. 4-6, examples of resource reservation in on-path PCC will be illustrated. For on-path PCC, the PCEF reserves resources for the service. Moreover, PCC rules are used in on-path. Secondly, with reference to FIGS. 7-9, examples of resource reservation in off-path PCC will be illustrated. For off-path PCC, the BBERF reserves resources for the service. Moreover, QoS rules are used in off-path.

As will be shown in the examples, resource reservation could both in on-path and off-path be done in two different ways. In a sequential resource reservation, the PCEF 10 requests reservation of resources required in the plurality of accesses in sequential order. In a parallel resource reservation, the PCEF requests reservation of resources required in the plurality of accesses in parallel.

As will also be shown in the examples, the PCC rule may both for sequential and parallel reservation allow for requesting reservation of resources in a plurality of accesses. For sequential reservation, the rule may as an alternative allow for requesting reservation of resource in only one (a first) access. This will be described further in the following.

As will be shown in the examples, when the PCC rule in sequential reservation allows for requesting reservation of resources in a plurality of accesses, the request of resource reservation may be performed in priority order. When the rule instead allows for requesting reservation of resources in only one access, the PCEF may requests reservation of resources required in a first access. It then continues to request reservation of resources required in one following access after having received a new rule allowing access to said following access. The PCRF then may select the following access in priority order.

When the PCC rule allows for reservation in a plurality of accesses, the PCEF 10 first attempts to reserve recourses for the service in the access with the highest priority. If this would fail then the access type with the second highest priority would be attempted and so on. When a successful resource allocation has been done, the PCEF reports the access type result for the PCC rule back to the PCRF 13. Sequential reservation would e.g. be suitable at service setup when somewhat longer delays are acceptable.

Parallel resource reservation may be used when e.g. service setup times do not allow for sequential resource reservations. Then an attempt to reserve resources in multiple accesses for the same service at the same time could be attempted. In parallel resource reservation, when resources are available in a plurality of accesses, the procedure may be that the single access is selected from the available resources in priority order. This will be shown in the examples relating to parallel reservation. The PCEF 10 will select one access, where the reservation was successful (based e.g. on priority or some other criteria), release the resources in the other access that were not selected and then report the selected access to the PCRF.

FIGS. 4-6 illustrates examples of sequential and parallel resource reservation in an on-path PCC. For on-path PCC, the PCEF reserves resources for the service. Moreover, PCC rules are used in on-path. In the examples, the UE 14 is assumed to have access to the same APN (Access Point Name) using two different access types, Access A 11 and Access B 12. Both may be used to carry a certain service that requires dedicated resources. A person skilled in the art would realize that the present invention embraces also when the UE has access using more than 2 different access types.

FIG. 4 illustrate an example of sequential reservation. In this example, a PCC rule is installed in the PCEF 10 that is valid for more than one access. In this example, the following steps are performed:

1. The PCRF 13 provides a new or updated PCC rule to the PCEF 10 for a certain Service Data Flow. The PCC rule requires dedicated resources to be reserved in the access network. The service is further on allowed for both access type A 11 and access type B 12, but access type A is preferred.

2. The PCEF requests reservation of the required resources in access A.

3. In case resources are available then they are reserved in the access.

4. The result of the reservation request is communicated back to the PCEF. If this is successful then step 5 to 7 are skipped and access type A is reported back to the PCRF in step 8.

5. If the reservation in access A is not successful then the PCEF continues to request resources in access B.

6. In case resources are available then they are reserved in the access.

7. The result of the reservation request is communicated back to the PCEF.

If this is successful then the access type B is reported back to the PCRF in step 8. If this is not successful then the PCEF reports a failure to the PCRF in step 8.

8. The PCEF reports the outcome of the resource reservation for the PCC rule installed in step 1. Based on this information the PCRF may initiate further action (e.g. change the charging-key/Rating Group).

FIG. 5 illustrate another example of sequential reservation. In this example, a PCC rule is installed in the PCEF 10 that is valid only for one access. If the resource reservation fails, the PCRF 13 installs the same PCC rule for another access. Thus this alternative demands less from the PCEF (and more from the PCRF) compared to the example according to FIG. 4. In this example, the following steps are performed:

1. The PCRF 13 provides a new or updated PCC rule to the PCEF 10 for a certain Service Data Flow. The PCC rule requires dedicated resources to be reserved in the access network. The service is further on allowed for both access type A 11 and access type B 12, but access type A is preferred.

2. The PCEF initiated requests reservation of the required resources in access A.

3. In case resources are available then they are reserved in the access.

4. The result of the reservation request is communicated back to the PCEF.

5. The result of the resource reservation is reported back to the PCRF. If the result was successful then the use case terminates here.

6. If the reservation in access A was not successful then the PCRF provides new or updated PCC rules for the same Service Data Flow as in step 1 but this time access type B is allowed in the PCC rule.

7. The PCEF now requests resources in access B.

8. In case resources are available then they are reserved in the access.

9. The result of the reservation request is communicated back to the PCEF.

10. The PCEF reports the outcome of the resource reservation for the PCC rule installed in step 6.

FIG. 6 illustrate an example of parallel reservation. A PCC rule is installed in the PCEF 10 that is valid for more than one access. The following steps are performed:

1. The PCRF 13 provides a new or updated PCC rule to the PCEF 10 for a certain Service Data Flow. The PCC rule requires dedicated resources to be reserved in the access network. The service is further on allowed for both access type A 11 and access type B 12, but access type A is preferred.

2a and 2b. The PCEF requests reservation of the required resources in access A and B at the same time. NOTE: The PCEF provides traffic mapping information for each access type. The filters included may be the same for each access; however they are separated by priority in order to avoid conflicting traffic mapping in the UE/MS.

3a and 3b. The resources in respective access are either allocated, pre-allocated or investigated.

4a and 4b. The result of the reservation request is communicated back to the PCEF 5a and 5b. A decision is then taken in PCEF which access to use, A or B. The resource request is finalized. This may include a) committing a pre-allocated resource, b) allocating a resource in an access where an investigation gave a positive result, c) requesting a rollback/release of any pre-allocated or allocated resources in the access decided not to be used. The PCEF may update the traffic mapping information in the selected access (i.e. access A or access B) if this is required.

6a and 6b. The different decisions provided by the PCEF are enforced by access A and access B.

7a and 7b. The result of the reservation request is communicated back to the PCEF.

8. The PCEF reports the outcome of the resource reservation for the PCC rule installed in step 1. If resources could be reserved the PCEF will report the selected access type to the PCRF. If resources could not be installed in access A or in access B then the PCEF reports a failure to the PCRF. Based on this information the PCRF may initiate further action (e.g. change the charging-key/Rating Group).

Figure 7:
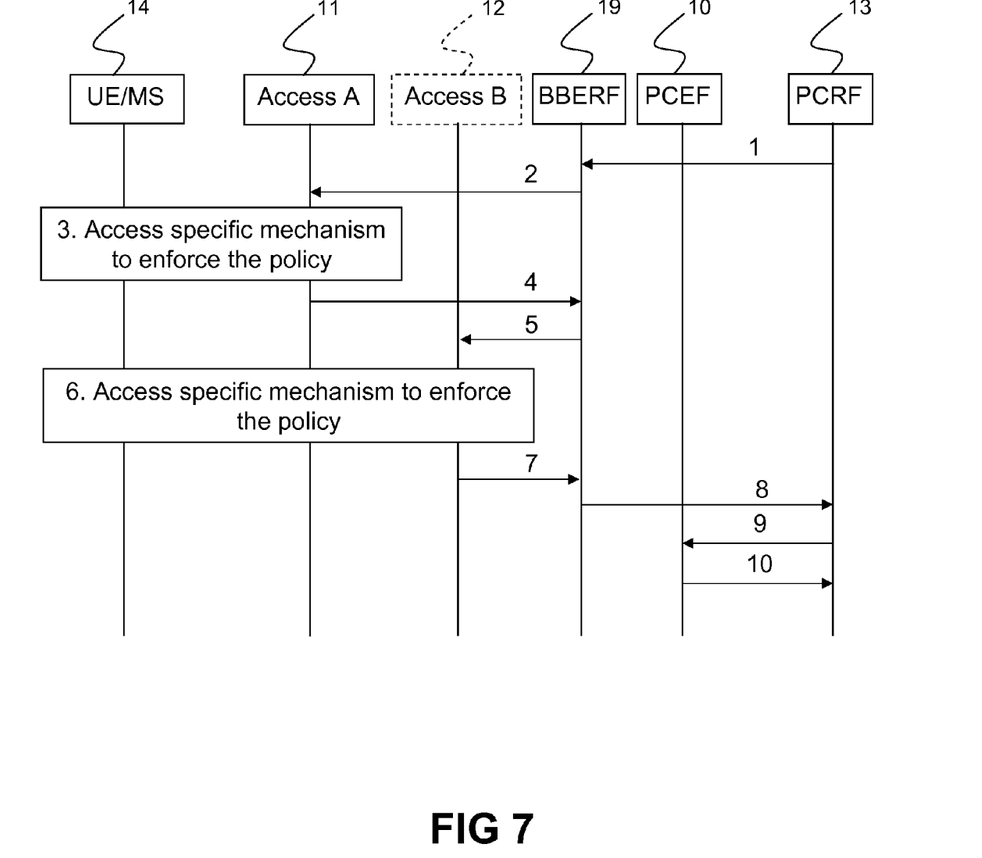
FIG. 7 illustrates a third alternative of sequential reservation of resources according to the present invention.
Figure 8:
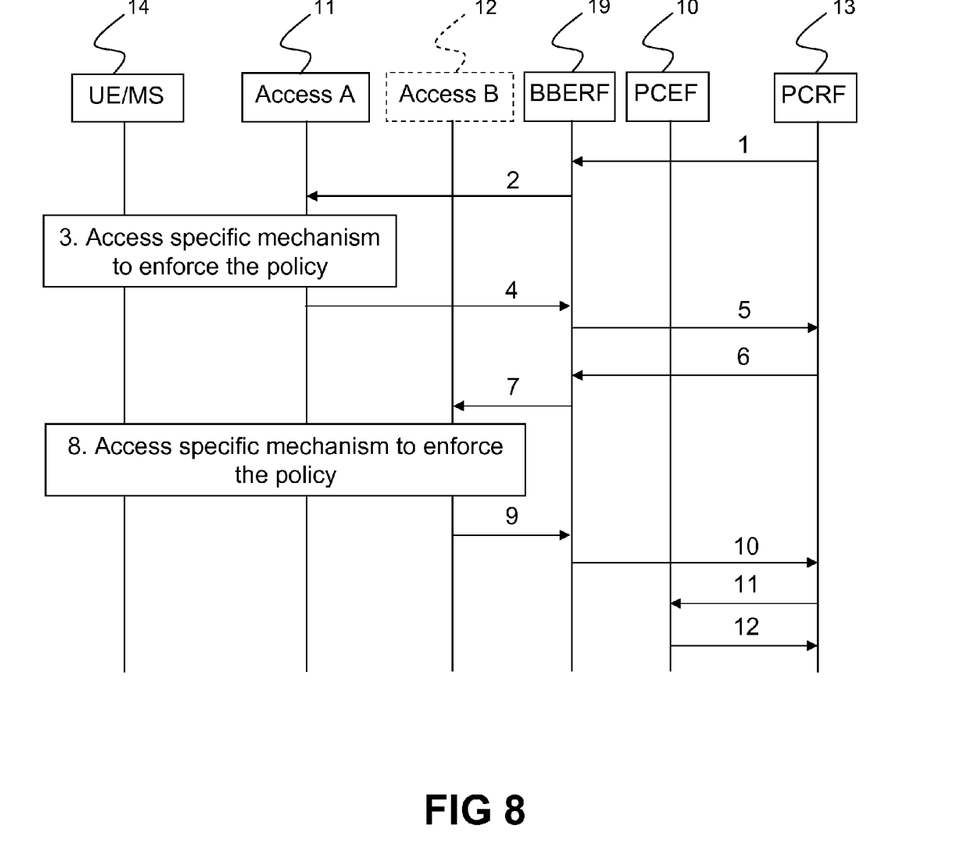
FIG. 8 illustrates a fourth alternative of sequential reservation of resources according to the present invention.
Figure 9:
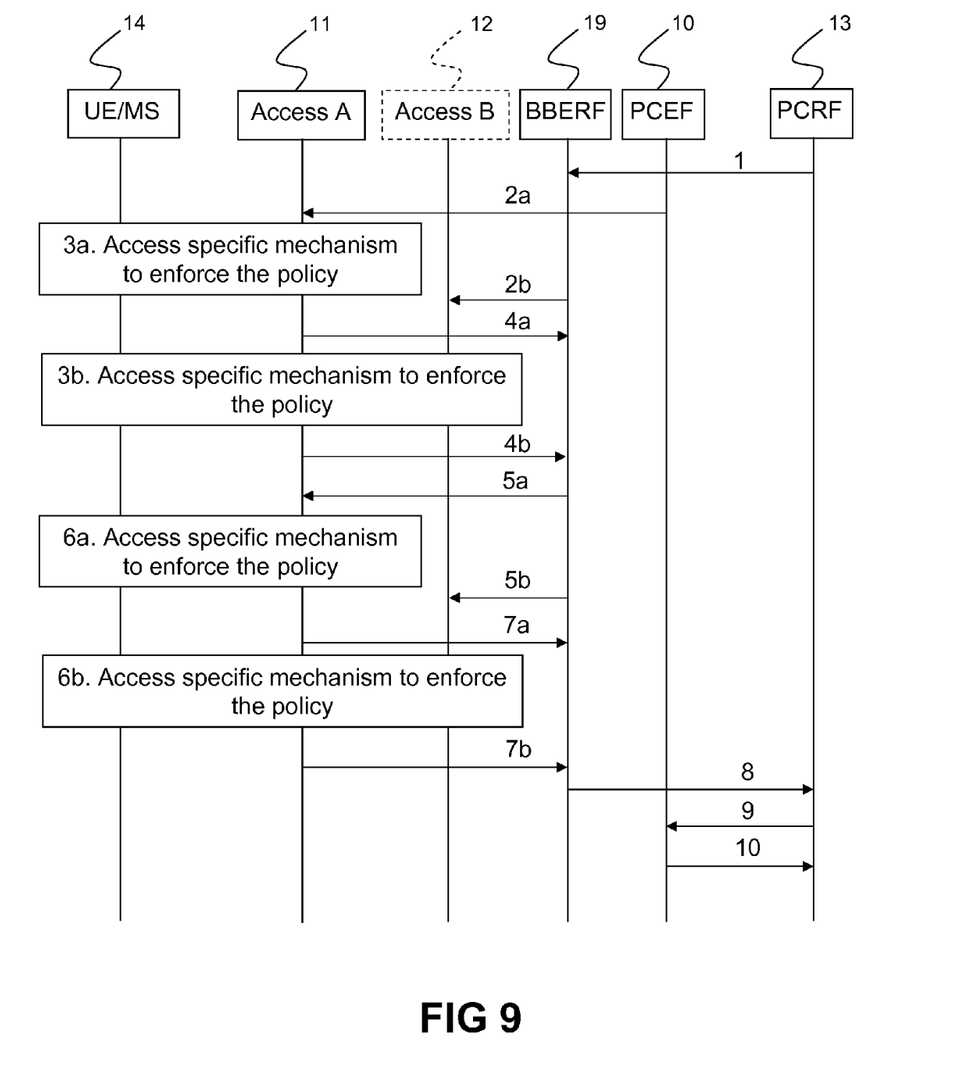
FIG. 9 illustrates a second alternative of parallel reservation of resources according to the present invention.

FIGS. 7-9 illustrates examples of sequential and parallel resource reservation in an off-path PCC. For off-path PCC, the BBERF reserves resources for the service. Moreover, QoS rules are used in off-path. The examples in many ways are similar with the examples according to FIGS. 4-6. However, new final steps are introduced since the BBERF can not install applicable PCC rules.

Also in these examples, the UE 14 is assumed to have access to the same APN (Access Point Name) using two different access types, Access A 11 and Access B 12. Both may be used to carry a certain service that requires dedicated resources. A person skilled in the art would realize that the present invention embraces also when the UE has access using more than 2 different access types.

FIG. 7 illustrate an example of sequential reservation. In this example, a QoS rule is installed in the BBERF 10 that is valid for more than one access. In this example, the following steps are performed:

1. The PCRF 13 provides a new or updated QoS rule to the BBERF 19 for a certain Service Data Flow. The QoS rule requires dedicated resources to be reserved in the access network. The service is further on allowed for both access type A 11 and access type B 12, but access type A is preferred.

2. The BBERF initiated requests reservation of the required resources in access A.

3. In case resources are available then they are reserved in the access.

4. The result of the reservation request is communicated back to the BBERF. If this is successful then step 5 to 7 are skipped and access type A is reported back to the PCRF in step 8.

5. If the reservation in access A is not successful then the BBERF continues to request resources in access B.

6. In case resources are available then they are reserved in the access.

7. The result of the reservation request is communicated back to the BBERF. If this is successful then the access type B is reported back to the PCRF in step 8. If this is not successful then the BBERF reports a failure to the PCRF in step 8.

8. The BBERF reports the outcome of the resource reservation for the QoS rule installed in step 1.

9. The PCRF installs an applicable PCC rule into the PCEF 10 according to the standard.

10. The PCEF reports back the outcome of the installation procedure.

FIG. 8 illustrate another example of sequential reservation. In this example, a QoS rule is installed in the BBERF 19 that is valid only for one access. If the resource reservation fails, the PCRF 13 installs the same QoS rule for another access. Note that this QoS rule might be installed in different BBERFs for different accesses. Thus this alternative demands less from the BBERF (and more from the PCRF) compared to the example according to FIG. 7. In this example, the following steps are performed:

1. The PCRF 13 provides a new or updated QoS rule to the BBERF 19 for a certain Service Data Flow. The QoS rule requires dedicated resources to be reserved in the access network. The service is further on allowed for both access type A 11 and access type B 12, but access type A is preferred.

2. The BBERF initiated requests reservation of the required resources in access A.

3. In case resources are available then they are reserved in the access.

4. The result of the reservation request is communicated back to the BBERF.

5. The result of the resource reservation is reported back to the PCRF. If the result was successful then the use continues in step 11

6. If the reservation in access A was not successful then the PCRF provides new or updated QoS rules for the same Service Data Flow as in step 1 but this time access type B is allowed in the QoS rule.

7. The BBERF now requests resources in access B. Note that it might be possible that this is different BBERF than the one used to request resources in access A (this is not showed in the figure).

8. In case resources are available then they are reserved in the access.

9. The result of the reservation request is communicated back to the BBERF.

10. The BBERF reports the outcome of the resource reservation for the QoS rule installed in step 6.

11. The PCRF installs an applicable PCC rule into the PCEF 10 according to the standard.

12. The PCEF reports back the outcome of the installation procedure.

FIG. 9 illustrate an example of parallel reservation. A QoS rule is installed in the BBERF 19 that is valid for more than one access. The following steps are performed:

1. The PCRF 13 provides a new or updated QoS rule to the BBERF 19 for a certain Service Data Flow. The QoS rule requires dedicated resources to be reserved in the access network. The service is further on allowed for both access type A 11 and access type B 12, but access type A is preferred.

2a and 2b. The BBERF requests reservation of the required resources in access A and B at the same time. The BBERF provides traffic mapping information for each access type. The filters included may be the same for each access; however they are separated by priority in order to avoid conflicting traffic mapping in the UE/MS.

3a and 3b. The resources in respective access are either allocated, pre-allocated or investigated.

4a and 4b. The result of the reservation request is communicated back to the BBERF.

5a and 5b. A decision is then taken in BBERF which access to use, A or B. The resource request is finalized. This may include a) committing a pre-allocated resource, b) allocating a resource in an access where an investigation gave a positive result, c) requesting a rollback/release of any pre-allocated or allocated resources in the access decided not to be used. The BBERF may update the traffic mapping information in the selected access (i.e. access A or access B) if this is required.

6a and 6b. The different decisions provided by the BBERF are enforced by access A and access B.

7a and 7b. The result of the reservation request is communicated back to the BBERF.

8. The BBERF reports the outcome of the resource reservation for the QoS rule installed in step 1. If resources could be reserved the BBERF will report the selected access type to the PCRF. If resources could not be installed in access A or in access B then the BBERF reports a failure to the PCRF.

9. The PCRF installs an applicable PCC rule into the PCEF according to the standard.

10. The PCRF reports back the outcome of the installation procedure.

The invention is not to be regarded as being limited to the examples shown in FIGS. 4-9 and described above. A number of additional variants and modifications are possible within the scope of the subsequent patent claims. For instance, combinations of sequential and parallel resource requests could be considered. For instance, parallel reservations are performed for the 2 highest prioritized accesses and if that fails then sequential reservation are performed of the next 2 etc. Moreover, the presented invention is possible to use both at initial connection setup and in mobility/handover situations.

The invention claimed is:

1. A method for enabling resource allocation for a service data flow between a user equipment and a gateway in a multiple access network environment, the method comprising the steps of:
   a resource reservation device receiving reservation instructions from a policy control node, the reservation instructions requiring dedicated access network resources to be reserved for the service data flow,
   the resource reservation device reporting, to the policy control node, a result of the resource reservation required by the reservation instructions,
   the resource reservation device requesting reservation of the resources required by the reservation instructions in a plurality of access networks,
   after requesting the reservation of the resources in the plurality of access networks, the resource reservation device selecting, from the plurality of access networks, an access network in which dedicated access network resources have been successfully reserved, and
   the resource reservation device reporting, to the policy control node, the selected access network.

2. The method according to claim 1, wherein the reservation instructions comprises information identifying which access network or access networks from which the resource reservation device should request reservation of resources.

3. The method according to claim 1, wherein the reservation instructions comprise a policy and charging control rule and wherein the resource reservation device comprises a policy control and enforcement function.

4. The method according to claim 1, wherein the reservation instructions comprise a quality of service rule and wherein the resource reservation device comprises a bearer binding and an event reporting function.

5. The method according to claim 1, wherein the reservation instructions allow for requesting reservation of resources in a plurality of access networks.

6. The method according to claim 5, wherein the request of resource reservation is performed in a priority order specified by the policy control node.

7. The method according to claim 5, wherein the resource reservation device requests reservation of resources required in the plurality of access networks sequentially.

8. The method according to claim 6, wherein the resource reservation device requests reservation of resources required in the plurality of access networks in parallel.

9. The method according to claim 8, wherein, in response to a determination that resources are available in the plurality of access networks the selected access network is selected from the available access networks in the priority order.

10. The method according to claim 6, wherein the reservation instructions allow for requesting reservation of resource in only a first access network.

11. The method according to claim 10, wherein the resource reservation device requests reservation of resources required in the first access network and continues to request reservation of required resources in one following access network after having received new reservation instructions allowing access to said following access network.

12. The method according to claim 11, wherein the following access network is selected in the priority order.

13. The method of claim 1, wherein the plurality of access networks are between the gateway and the user equipment.

14. A resource reservation device being adapted to enable resource allocation for a service data flow between a user equipment and a gateway in a multiple access network environment, the resource reservation device comprising:
a receiver for receiving reservation instructions from a policy control node, the reservation instructions requiring dedicated access network resources to be reserved for the service data flow,
a transmitter, and
a processor configured to:
report, to the policy control node, a result of the resource reservation required by the reservation instructions,
request reservation of the resources required by the reservation instructions in a plurality of access networks,
after requesting the reservation of the resources in the plurality of access networks, select, from the plurality of access networks, an access network in which dedicated access network resources have been successfully reserved, and
report, to the policy control node, the selected access network.

15. The resource reservation device according to claim 14, wherein the resource reservation device comprises a policy control and enforcement function.

16. The resource reservation device according to claim 14, wherein the resource reservation device comprises a bearer binding and an event reporting function.

17. A policy control node being adapted to enable resource allocation for a service data flow between a user equipment and a gateway in a multiple access network environment, the policy control node comprising:
a transmitter;
a processor configured to employ the transmitter to send reservation instructions to the resource reservation device of claim 14, the reservation instructions requiring dedicated access network resources to be reserved for the service data flow,
a receiver for receiving the report of claim 14 from the resource reservation device, the report including the result of the resource reservation required by the reservation instructions and the selected access network.

18. The policy control node according to claim 17, wherein the policy control node comprises a policy and charging rules function.

19. A system adapted to enable resource allocation for a service data flow between a user equipment and a gateway in a multiple access network environment, the system including a resource reservation device, said resource reservation device comprising:
a receiver for receiving reservation instructions from a policy control node according to claim 17, the reservation instructions requiring dedicated access network resources to be reserved for the service data flow,
a transmitter, and
a processor configured to:
report the result of the resource reservation required by the reservation instructions to the policy control node,
request reservation of the resources required by the reservation instructions in a plurality of access networks,
select, from the plurality of access networks, an access network in which dedicated access network resources have been successfully reserved, and
report, to the policy control node, the selected access network.

20. A method for enabling resource allocation for a service data flow between a user equipment (UE) and a gateway (GW) in a multiple access network environment, comprising:
a resource reservation device receiving instructions identifying resources to be reserved for the service data flow, the instructions being received from a policy control node;
the resource reservation device requesting reservation of resources in a first access network;
the resource reservation device receiving a first indication that indicates whether the reservation request in the first access network is successful;
the resource reservation device requesting reservation of resources in a second access network;
the resource reservation device receiving a second indication that indicates that the reservation request in the second access network is successful;
after receiving said indications, the resource reservation device selecting an access network from a set of access networks, which set of access networks includes the first access network and the second access network; and
the resource reservation device reporting the selected access network to the policy control node.

21. The method of claim 20, wherein the first indication indicates that that the reservation request in the first access network is unsuccessful, and wherein the requesting of reservation resources in the second access network is performed in response to the first indication and is performed without reporting the first indication to the policy control node.

22. The method of claim 20, wherein the requesting reservation of resources in the first access network and the requesting reservation of resources in the second access network are performed in parallel, and wherein the first indication indicates that the reservation request in the first access network is successful, the method further comprising:
  requesting a release of any pre-allocated or allocated resources in the unselected access.

23. The method of claim 20, wherein the first indication indicates that the reservation request in the first access network is unsuccessful, and wherein the instructions include a rule that is used to classify packets for the service data flow and that is valid for only the first access network, the method further comprising:
  reporting the first indication to the policy control node; and
  receiving new instructions having a new rule that is valid for the second access network, wherein the requesting of resources in the second access network is performed in response to receiving the new rule.

24. The method of claim 20, wherein the resource reservation device that selects the access network from the set of access networks is located in a core network.

25. The method of claim 24, wherein the resource reservation device is located in the gateway and implements a policy control and enforcement function (PCEF).

* * * * *